US012293740B1

(12) United States Patent
Chou et al.

(10) Patent No.: US 12,293,740 B1
(45) Date of Patent: May 6, 2025

(54) DISPLAYS WITH DISPARITY-CAUSED SHIFT COMPENSATION

(71) Applicant: Apple Inc., Cupertino, CA (US)

(72) Inventors: Ping-Yen Chou, Santa Clara, CA (US); ByoungSuk Kim, Palo Alto, CA (US); Fu-Chung Huang, Cupertino, CA (US); Hao Chen, Santa Clara, CA (US); Juan He, San Jose, CA (US); Jun Qi, San Jose, CA (US); Mingming Wang, San Jose, CA (US); Sheng Zhang, San Jose, CA (US); Yang Li, San Jose, CA (US); Yi Huang, San Jose, CA (US); Yi-Pai Huang, Zhubei (TW); Yunhui Hou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/072,192

(22) Filed: Nov. 30, 2022

Related U.S. Application Data

(60) Provisional application No. 63/296,417, filed on Jan. 4, 2022.

(51) Int. Cl.
*G09G 5/10* (2006.01)
*G09G 3/00* (2006.01)

(52) U.S. Cl.
CPC ............... *G09G 5/10* (2013.01); *G09G 3/007* (2013.01); *G09G 2320/0626* (2013.01); *G09G 2320/0693* (2013.01)

(58) Field of Classification Search
None
See application file for complete search history.

(56) References Cited

U.S. PATENT DOCUMENTS

| | | | |
|---|---|---|---|
| 7,425,069 | B2 | 9/2008 | Schwerdtner et al. |
| 8,692,871 | B2 | 4/2014 | Harrold et al. |
| 9,361,727 | B2 | 6/2016 | Fuchs et al. |
| 9,667,952 | B2 | 5/2017 | Itoh |
| 9,712,810 | B2 | 7/2017 | Smithwick et al. |
| 9,927,623 | B2 | 3/2018 | Johnson et al. |
| 10,136,125 | B2 | 11/2018 | Yoon et al. |
| 10,171,792 | B2 | 1/2019 | Liu et al. |
| 10,237,541 | B2 | 3/2019 | Hasegawa et al. |

(Continued)

*Primary Examiner* — Amr A Awad
*Assistant Examiner* — Donna V Bocar
(74) *Attorney, Agent, or Firm* — Treyz Law Group, P.C.; Joseph F. Guihan; Jinie M. Guihan

(57) ABSTRACT

An electronic device may include a lenticular display. The lenticular display may have a lenticular lens film formed over an array of pixels. A plurality of lenticular lenses may extend across the length of the display. The lenticular lenses may be configured to enable stereoscopic viewing of the display such that a viewer perceives three-dimensional images. Crosstalk between viewing zones and disparity between images received from different viewing zones may result in disparity-caused shifts in images perceived by viewer of the lenticular display. To mitigate these disparity-caused shifts, compensation circuitry may be included in the display pipeline circuitry. The compensation circuitry may include stored disparity-caused shift calibration information that is used for the compensation. The stored disparity-caused shift calibration information may be a polynomial function that outputs a magnitude of disparity-caused shift for a given pixel location.

20 Claims, 15 Drawing Sheets

(56) References Cited

U.S. PATENT DOCUMENTS

| | | | | |
|---|---|---|---|---|
| 2007/0008619 | A1 | 1/2007 | Cha et al. | |
| 2007/0035706 | A1* | 2/2007 | Margulis | H04N 9/3102 353/122 |
| 2011/0157471 | A1* | 6/2011 | Seshadri | H04N 13/161 348/E5.099 |
| 2012/0062991 | A1 | 3/2012 | Krijn et al. | |
| 2012/0113153 | A1* | 5/2012 | Casner | H04N 13/32 345/690 |
| 2014/0043323 | A1 | 2/2014 | Sumi | |
| 2015/0015668 | A1 | 1/2015 | Bennett et al. | |
| 2015/0145977 | A1 | 5/2015 | Hoffman | |
| 2016/0021367 | A1 | 1/2016 | Yoon et al. | |
| 2016/0266398 | A1 | 9/2016 | Poon et al. | |
| 2016/0349523 | A1 | 12/2016 | Wei | |
| 2017/0054963 | A1* | 2/2017 | Kasazumi | H04N 13/302 |
| 2018/0373101 | A1 | 12/2018 | Chen | |
| 2022/0357591 | A1* | 11/2022 | Makinen | H04N 13/305 |
| 2023/0030931 | A1* | 2/2023 | Takahashi | H04N 13/371 |
| 2024/0073391 | A1* | 2/2024 | Gotoh | G02B 27/00 |

* cited by examiner

DISPLAYS WITH DISPARITY-CAUSED SHIFT COMPENSATION

This application claims priority to U.S. provisional patent application No. 63/296,417, filed Jan. 4, 2022, which is hereby incorporated by reference herein in its entirety.

FIELD

This relates generally to electronic devices, and, more particularly, to electronic devices with displays.

BACKGROUND

Electronic devices often include displays. In some cases, displays may include lenticular lenses that enable the display to provide three-dimensional content to the viewer. The lenticular lenses may be formed over an array of pixels such as organic light-emitting diode pixels or liquid crystal display pixels.

SUMMARY

An electronic device may include a lenticular display. The lenticular display may have a lenticular lens film formed over an array of pixels. A plurality of lenticular lenses may extend across the length of the display. The lenticular lenses may be configured to enable stereoscopic viewing of the display such that a viewer perceives three-dimensional images.

The display may have a number of independently controllable viewing zones. Each viewing zone displays a respective two-dimensional image. Each eye of the viewer may receive a different one of the two-dimensional images, resulting in a perceived three-dimensional image.

Crosstalk between viewing zones and disparity between images received from different viewing zones may result in disparity-caused shifts in images perceived by viewer of the lenticular display. To mitigate these disparity-caused shifts, compensation circuitry may be included in the display pipeline circuitry.

The display pipeline circuitry may provide brightness values to display driver circuitry that then controls the lenticular display to display images. The compensation circuitry may compensate the brightness values provided to the display driver circuitry for disparity-caused shifts. The compensation circuitry may include stored disparity-caused shift calibration information that is used for the compensation. The stored disparity-caused shift calibration information may be a polynomial function that outputs a magnitude of disparity-caused shift for a given pixel location. The compensation circuitry may be incorporated into UV mapping circuitry, view mapping circuitry, or content rendering circuitry in the display pipeline.

DETAILED DESCRIPTION

Figure 1:
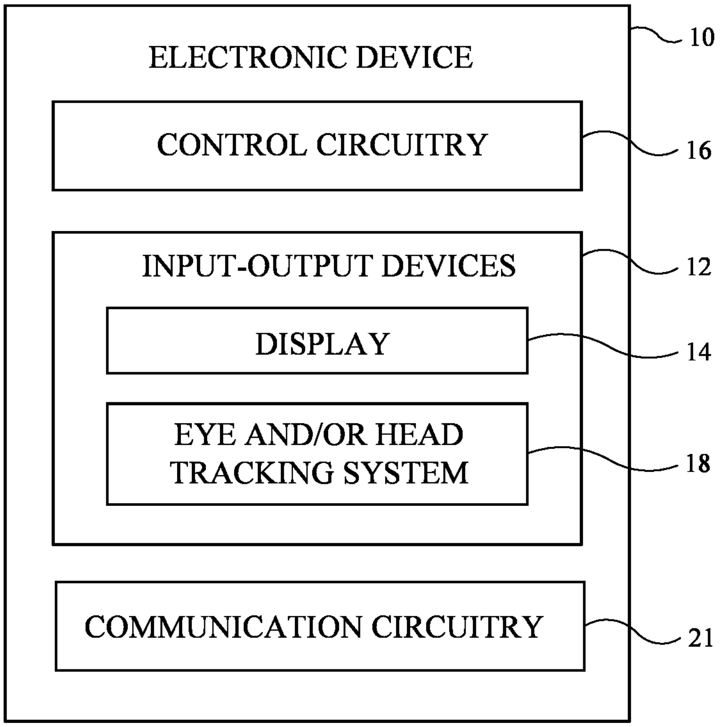
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Some electronic devices may include two displays. In one possible arrangement, a first display may be positioned on one side of the device and a second display may be positioned on a second, opposing side of the device. The first and second displays therefore may have a back-to-back arrangement. One or both of the displays may be curved.

Sensors in input-output devices 12 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors in input-output devices 12 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors.

Control circuitry 16 may be used to run software on device 10 such as operating system code and applications. During operation of device 10, the software running on control circuitry 16 may display images on display 14 using an array of pixels in display 14.

Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Device 10 may include cameras and other components that form part of eye and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). This head-location information obtained by system 18 may be used to determine the appropriate direction with which display content from display 14 should be directed. Eye and/or head tracking system 18 may include any desired number/combination of infrared and/or visible light detectors. Eye and/or head tracking system 18 may optionally include light emitters to illuminate the scene. Eye and/or head tracking system may include a light detection and ranging (lidar) sensor, a time-of-flight (ToF) sensor, an accelerometer (e.g., to detect the orientation of electronic device 10), a camera, or a combination of two or more of these components. Including sensors such as a light detection and ranging (lidar) sensor, a time-of-flight (ToF) sensor, or an accelerometer may improve acquisition speeds when tracking eye/head position of the viewer.

Figure 2:
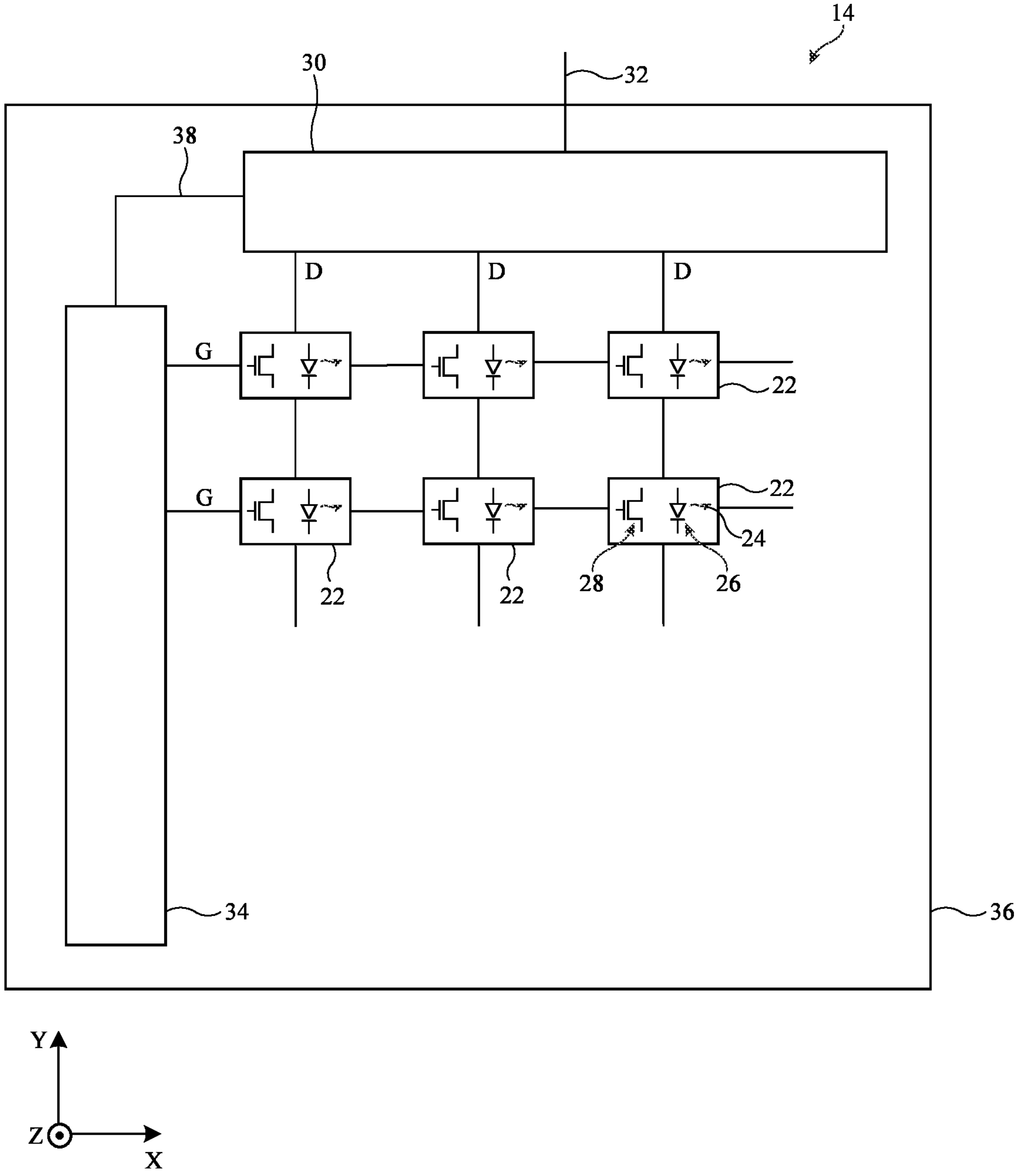
FIG. 2 is a top view of an illustrative display in an electronic device in accordance with an embodiment.

A top view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel circuit formed from thin-film transistor circuitry (such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors. Pixels 22 may contain light-emitting diodes of different colors (e.g., red, green, and blue diodes for red, green, and blue pixels, respectively) to provide display 14 with the ability to display color images.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines G in display 14 may carry gate line signals (scan line signals), emission enable control signals, and other horizontal control signals for controlling the pixels of each row. There may be any suitable number of horizontal control signals per row of pixels 22 (e.g., one or more, two or more, three or more, four or more, etc.).

Display 14 may sometimes be a stereoscopic display that is configured to display three-dimensional content for a viewer. Stereoscopic displays are capable of displaying multiple two-dimensional images that are viewed from slightly different angles. When viewed together, the combination of the two-dimensional images creates the illusion of a three-dimensional image for the viewer. For example, a viewer's left eye may receive a first two-dimensional image and a viewer's right eye may receive a second, different two-dimensional image. The viewer perceives these two different two-dimensional images as a single three-dimensional image.

There are numerous ways to implement a stereoscopic display. Display 14 (sometimes referred to as stereoscopic display 14, lenticular display 14, three-dimensional display 14, etc.) may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display 14 is a lenticular display are sometimes described herein as an example.

Figure 3:
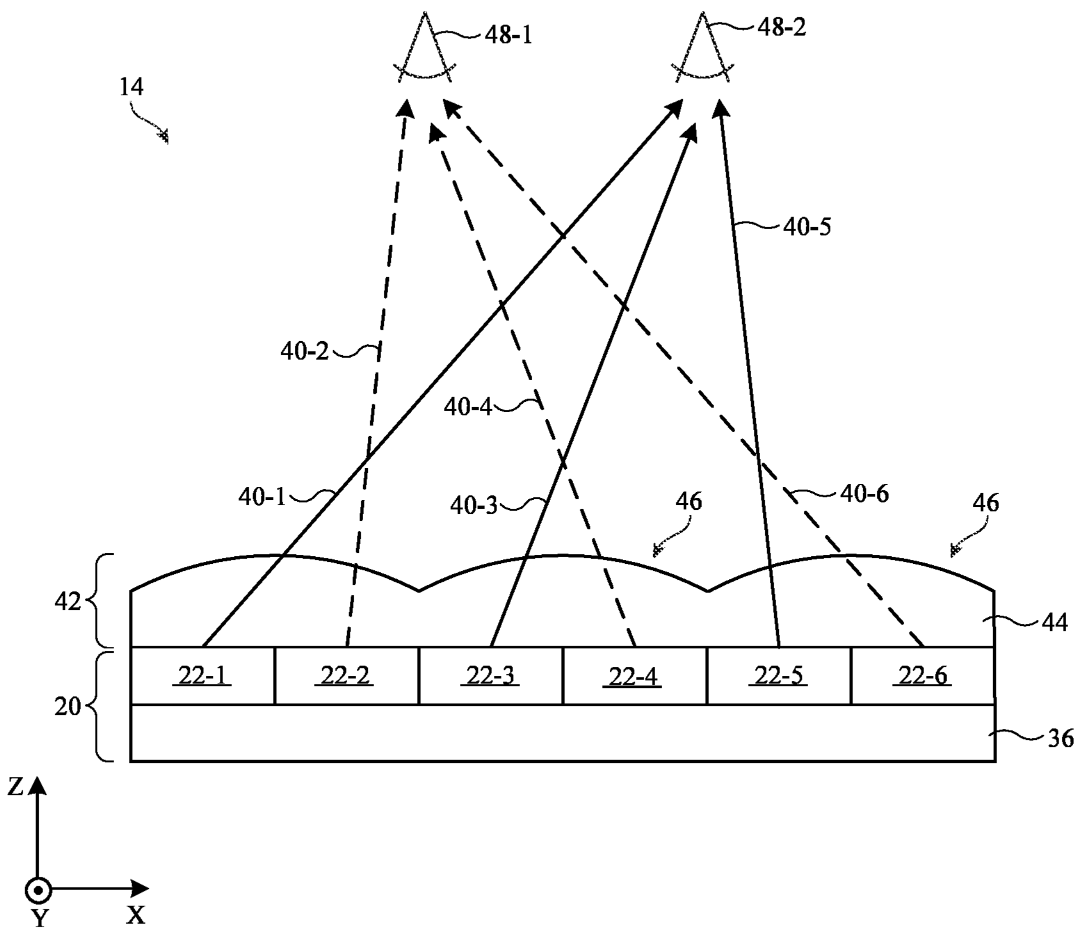
FIG. 3 is a cross-sectional side view of an illustrative lenticular display that provides images to a viewer in accordance with an embodiment.

FIG. 3 is a cross-sectional side view of an illustrative lenticular display that may be incorporated into electronic device 10. Display 14 includes a display panel 20 with pixels 22 on substrate 36. Substrate 36 may be formed from glass, metal, plastic, ceramic, or other substrate materials and pixels 22 may be organic light-emitting diode pixels, liquid crystal display pixels, or any other desired type of pixels.

As shown in FIG. 3, lenticular lens film 42 (sometimes referred to as stereoscopic lens film 42 or lens film 42) may be formed over the display pixels. Lenticular lens film 42 (sometimes referred to as a light redirecting film, a lens film, etc.) includes lenses 46 and a base film portion 44 (e.g., a planar film portion to which lenses 46 are attached). Lenses 46 may be lenticular lenses that extend along respective longitudinal axes (e.g., axes that extend into the page parallel to the Y-axis). Lenses 46 may be referred to as lenticular elements 46, lenticular lenses 46, optical elements 46, etc.

The lenses 46 of the lenticular lens film cover the pixels of display 14. An example is shown in FIG. 3 with display pixels 22-1, 22-2, 22-3, 22-4, 22-5, and 22-6. In this example, display pixels 22-1 and 22-2 are covered by a first lenticular lens 46, display pixels 22-3 and 22-4 are covered by a second lenticular lens 46, and display pixels 22-5 and 22-6 are covered by a third lenticular lens 46. The lenticular lenses may redirect light from the display pixels to enable stereoscopic viewing of the display.

Consider the example of display 14 being viewed by a viewer with a first eye (e.g., a right eye) 48-1 and a second eye (e.g., a left eye) 48-2. Light from pixel 22-1 is directed by the lenticular lens film in direction 40-1 towards left eye 48-2, light from pixel 22-2 is directed by the lenticular lens film in direction 40-2 towards right eye 48-1, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-2, light from pixel 22-6 is directed by the lenticular lens film in direction 40-6 towards right eye 48-1. In this way, the viewer's right eye 48-1 receives images from pixels 22-2, 22-4, and 22-6, whereas left eye 48-2 receives images from pixels 22-1, 22-3, and 22-5. Pixels 22-2, 22-4, and 22-6 may be used to display a slightly different image than pixels 22-1, 22-3, and 22-5. Consequently, the viewer may perceive the received images as a single three-dimensional image.

Pixels of the same color may be covered by a respective lenticular lens 46. In one example, pixels 22-1 and 22-2 may be red pixels that emit red light, pixels 22-3 and 22-4 may be green pixels that emit green light, and pixels 22-5 and 22-6 may be blue pixels that emit blue light. This example is merely illustrative. In general, each lenticular lens may cover any desired number of pixels each having any desired color. The lenticular lens may cover a plurality of pixels having the same color, may cover a plurality of pixels each having different colors, may cover a plurality of pixels with some pixels being the same color and some pixels being different colors, etc.

Figure 4:
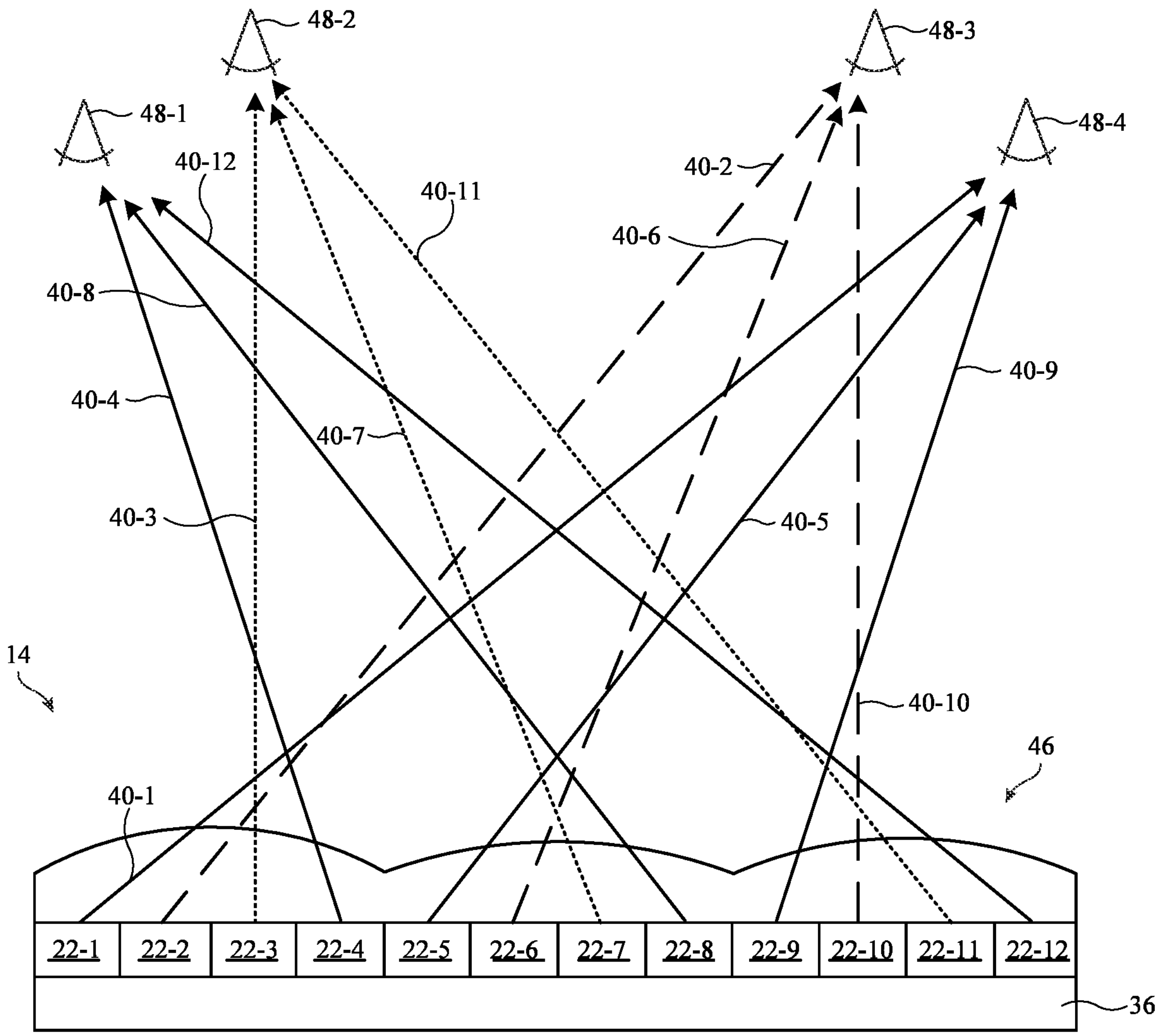
FIG. 4 is a cross-sectional side view of an illustrative lenticular display that provides images to two or more viewers in accordance with an embodiment.

FIG. 4 is a cross-sectional side view of an illustrative stereoscopic display showing how the stereoscopic display may be viewable by multiple viewers. The stereoscopic display of FIG. 3 may have one optimal viewing position (e.g., one viewing position where the images from the display are perceived as three-dimensional). The stereoscopic display of FIG. 4 may have two or more optimal viewing positions (e.g., two or more viewing positions where the images from the display are perceived as three-dimensional).

Display 14 may be viewed by both a first viewer with a right eye 48-1 and a left eye 48-2 and a second viewer with a right eye 48-3 and a left eye 48-4. Light from pixel 22-1 is directed by the lenticular lens film in direction 40-1 towards left eye 48-4, light from pixel 22-2 is directed by the lenticular lens film in direction 40-2 towards right eye 48-3, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-4, light from pixel 22-6 is directed by the lenticular lens film in direction 40-6 towards right eye 48-3, light from pixel 22-7 is directed by the lenticular lens film in direction 40-7 towards left eye 48-2, light from pixel 22-8 is directed by the lenticular lens film in direction 40-8 towards right eye 48-1, light from pixel 22-9 is directed by the lenticular lens film in direction 40-9 towards left eye 48-4, light from pixel 22-10 is directed by the lenticular lens film in direction 40-10 towards right eye 48-3, light from pixel 22-11 is directed by the lenticular lens film in direction 40-11 towards left eye 48-2, and light from pixel 22-12 is directed by the lenticular lens film in direction 40-12 towards right eye 48-1. In this way, the first viewer's right eye 48-1 receives images from pixels 22-4, 22-8, and 22-12, whereas left eye 48-2 receives images from pixels 22-3, 22-7, and 22-11. Pixels 22-4, 22-8, and 22-12 may be used to display a slightly different image than pixels 22-3, 22-7, and 22-11. Consequently, the first viewer may perceive the received images as a single three-dimensional image. Similarly, the second viewer's right eye 48-3 receives images from pixels 22-2, 22-6, and 22-10, whereas left eye 48-4 receives images from pixels 22-1, 22-5, and 22-9. Pixels 22-2, 22-6, and 22-10 may be used to display a slightly different image than pixels 22-1, 22-5, and 22-9. Consequently, the second viewer may perceive the received images as a single three-dimensional image.

Pixels of the same color may be covered by a respective lenticular lens 46. In one example, pixels 22-1, 22-2, 22-3, and 22-4 may be red pixels that emit red light, pixels 22-5, 22-6, 22-7, and 22-8 may be green pixels that emit green light, and pixels 22-9, 22-10, 22-11, and 22-12 may be blue pixels that emit blue light. This example is merely illustrative. The display may be used to present the same three-dimensional image to both viewers or may present different three-dimensional images to different viewers. In some cases, control circuitry in the electronic device 10 may use eye and/or head tracking system 18 to track the position of one or more viewers and display images on the display based on the detected position of the one or more viewers.

It should be understood that the lenticular lens shapes and directional arrows of FIGS. 3 and 4 are merely illustrative. The actual rays of light from each pixel may follow more complicated paths (e.g., with redirection occurring due to refraction, total internal reflection, etc.). Additionally, light from each pixel may be emitted over a range of angles. The lenticular display may also have lenticular lenses of any desired shape or shapes. Each lenticular lens may have a width that covers two pixels, three pixels, four pixels, more than four pixels, more than ten pixels, etc. Each lenticular lens may have a length that extends across the entire display (e.g., parallel to columns of pixels in the display).

Figure 5:
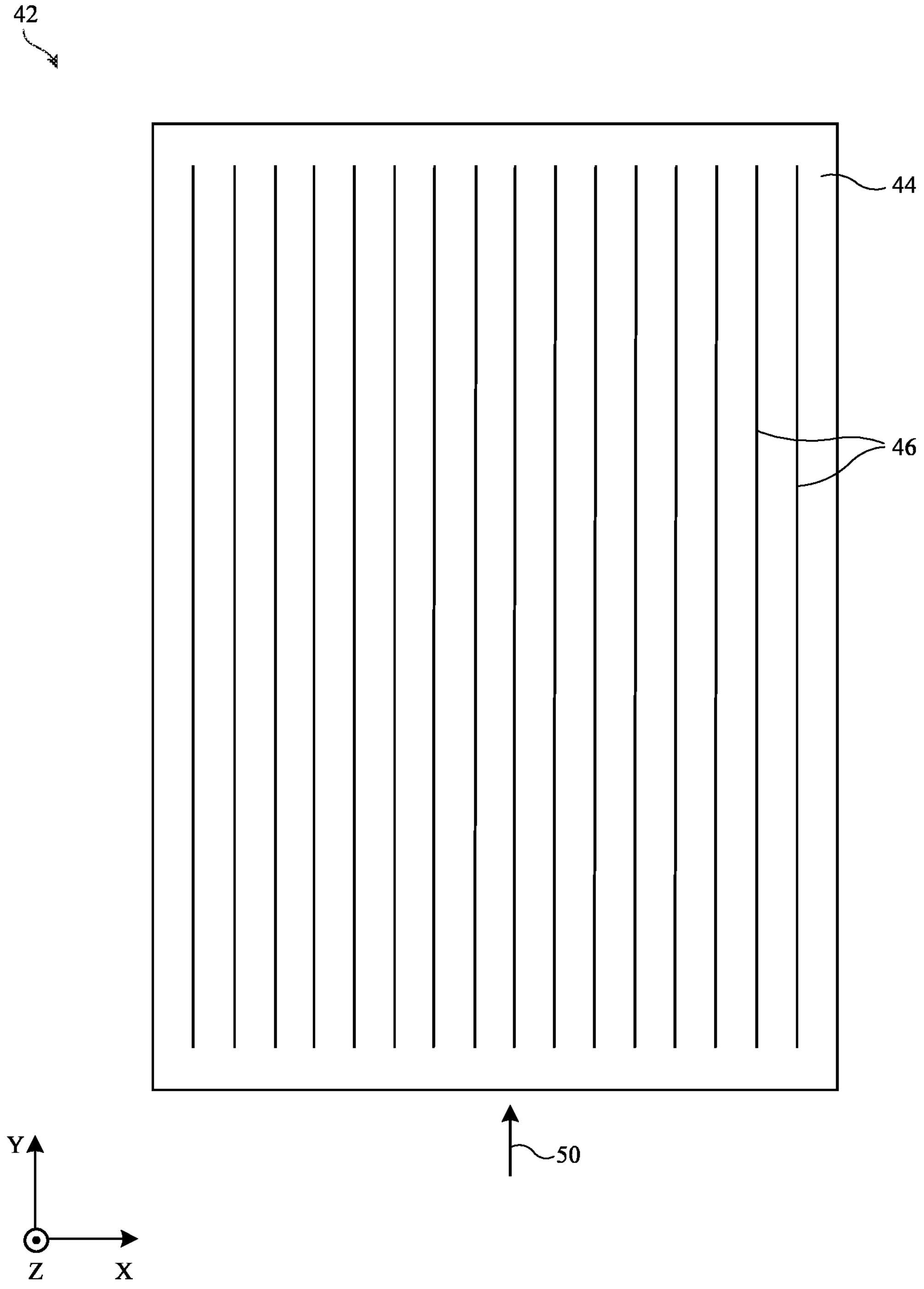
FIG. 5 is a top view of an illustrative lenticular lens film showing the elongated shape of the lenticular lenses in accordance with an embodiment.

FIG. 5 is a top view of an illustrative lenticular lens film that may be incorporated into a lenticular display. As shown in FIG. 5, elongated lenses 46 extend across the display parallel to the Y-axis. For example, the cross-sectional side view of FIGS. 3 and 4 may be taken looking in direction 50. The lenticular display may include any desired number of lenticular lenses 46 (e.g., more than 10, more than 100, more than 1,000, more than 10,000, etc.). In FIG. 5, the lenticular lenses extend perpendicular to the upper and lower edge of the display panel. This arrangement is merely illustrative, and the lenticular lenses may instead extend at a non-zero, non-perpendicular angle (e.g., diagonally) relative to the display panel if desired. With the arrangement of FIG. 5, the lenticular lenses split the display into distinct viewing zones along the X-axis.

The X-axis may be considered the horizontal axis for the display whereas the Y-axis may be considered the vertical axis for the display. As shown in FIG. 3, for example, the display may be oriented such that the user's eyes are located in the XY-plane with an offset between the eyes along the X-axis (e.g., in the horizontal direction). In other words, the left and right eye of the user have the same vertical position but different horizontal positions when viewing the display. Accordingly, lenticular lenses in FIG. 5 split the display into viewing zones along the X-axis such that each eye may view a different image from the display.

Figure 6:
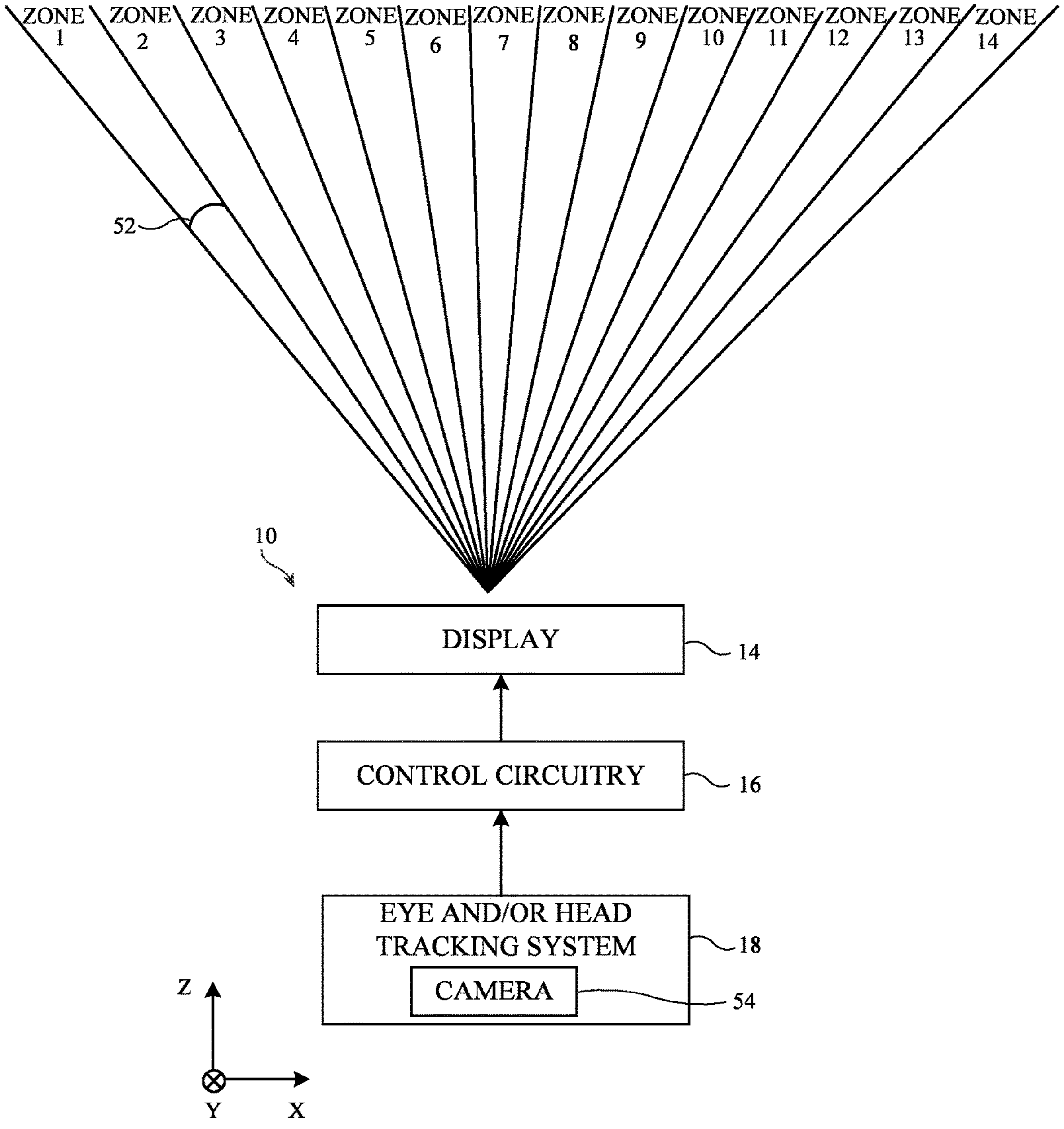
FIG. 6 is a diagram of an illustrative display that includes an eye and/or head tracking system that determines viewer eye position and control circuitry that updates the display based on the viewer eye position in accordance with an embodiment.

FIG. 6 is a schematic diagram of an illustrative electronic device showing how information from eye and/or head tracking system 18 may be used to control operation of the display. As shown in FIG. 6, display 14 is capable of providing unique images across a number of distinct zones. In FIG. 6, display 14 emits light across 14 zones, each having a respective angle of view 52 along the X-axis. The angle 52 may be between 1° and 2°, between 0° and 4°, less than 5°, less than 3°, less than 2°, less than 1.5°, greater than 0.5°, or any other desired angle. Each zone may have the same associated viewing angle or different zones may have different associated viewing angles.

The example herein of the display having 14 independently controllable zones is merely illustrative. In general, the display may have any desired number of independently controllable zones (e.g., more than 2, more than 6, more than 10, more than 12, more than 16, more than 20, more than 30, more than 40, less than 40, between 10 and 30, between 12 and 25, etc.).

Each zone is capable of displaying a unique image to the viewer. The sub-pixels on display 14 may be divided into groups, with each group of sub-pixels capable of displaying an image for a particular zone. For example, a first subset of sub-pixels in display 14 is used to display an image (e.g., a two-dimensional image) for zone 1, a second subset of sub-pixels in display 14 is used to display an image for zone 2, a third subset of sub-pixels in display 14 is used to display an image for zone 3, etc. In other words, the sub-pixels in display 14 may be divided into 14 groups, with each group associated with a corresponding zone (sometimes referred to as viewing zone) and capable of displaying a unique image for that zone. The sub-pixel groups may also themselves be referred to as zones.

Control circuitry 16 may control display 14 to display desired images in each viewing zone. There is much flexibility in how the display provides images to the different viewing zones. Display 14 may display entirely different content in different zones of the display. For example, an image of a first object (e.g., a cube) is displayed for zone 1, an image of a second, different object (e.g., a pyramid) is displayed for zone 2, an image of a third, different object (e.g., a cylinder) is displayed for zone 3, etc. This type of scheme may be used to allow different viewers to view entirely different scenes from the same display. However, in practice there may be crosstalk between the viewing zones. As an example, content intended for zone 3 may not be contained entirely within viewing zone 3 and may leak into viewing zones 2 and 4.

Figure 7A:
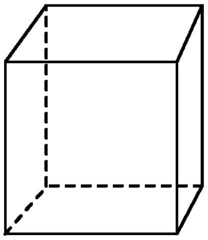
FIGS. 7A-7C are perspective views of illustrative three-dimensional content that may be displayed on different zones of the display of FIG. 6 in accordance with an embodiment.
Figure 7B:
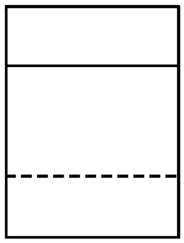
Figure 7C:
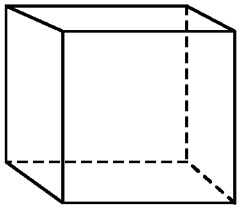

Therefore, in another possible use-case, display 14 may display a similar image for each viewing zone, with slight adjustments for perspective between each zone. This may be referred to as displaying the same content at different perspectives, with one image corresponding to a unique perspective of the same content. For example, consider an example where the display is used to display a three-dimensional cube. The same content (e.g., the cube) may be displayed on all of the different zones in the display. However, the image of the cube provided to each viewing zone may account for the viewing angle associated with that particular zone. In zone 1, for example, the viewing cone may be at a −10° angle relative to the surface normal of the display (along the horizontal direction). Therefore, the image of the cube displayed for zone 1 may be from the perspective of a −10° angle relative to the surface normal of the cube (as in FIG. 7A). Zone 7, in contrast, is at approximately the surface normal of the display. Therefore, the image of the cube displayed for zone 7 may be from the perspective of a 0° angle relative to the surface normal of the cube (as in FIG. 7B). Zone 14 is at a 10° angle relative to the surface normal of the display (along the horizontal direction). Therefore, the image of the cube displayed for zone 14 may be from the perspective of a 10° angle relative to the surface normal of the cube (as in FIG. 7C). As a viewer progresses horizontally (e.g., in the positive X-direction) from zone 1 to zone 14 in order, the appearance of the cube gradually changes to simulate looking at a real-world object.

There are many possible variations for how display 14 displays content for the viewing zones. In general, each viewing zone may be provided with any desired image based on the application of the electronic device. Different zones may provide different images of the same content at different perspectives, different zones may provide different images of different content, etc.

In one possible scenario, display 14 may display images for all of the viewing zones at the same time. However, this requires emitting light with all of the sub-pixels in the display in order to generate images for each viewing zone. To reduce power consumption in the display, one or more of the zones may be disabled based on information from the eye and/or head tracking system 18.

Eye and/or head tracking system 18 (sometimes referred to as viewer tracking system 18, head tracking system 18, or tracking system 18) may use one or more cameras such as camera 54 to capture images of the area in front of the display 14 where a viewer is expected to be present. The example of eye and/or head tracking system 18 including a camera 54 is merely illustrative. Eye and/or head tracking system may include a light detection and ranging (lidar) sensor, a time-of-flight (ToF) sensor, an accelerometer (e.g., to detect the orientation of electronic device 10), a camera, or a combination of two or more of these components. Including sensors such as a light detection and ranging (lidar) sensor, a time-of-flight (ToF) sensor, or an accelerometer may improve acquisition speeds when tracking eye/head position of the viewer. The tracking system may use information gathered by the sensors (e.g., sensor data) to identify a position of the viewer relative to the viewing zones. In other words, the tracking system may be used to determine which viewing zone(s) the viewer is occupying. Each eye of the user may be associated with a different viewing zone (in order to allow three-dimensional content to be perceived by the user from the display). Based on the captured images, tracking system 18 may identify a first viewing zone associated with a left eye of the viewer and a second viewing zone associated with a right eye of the viewer. Tracking system 18 may use one camera, two cameras, three cameras, more than three cameras, etc. to obtain information on the position of the viewer(s). The cameras in the tracking system may capture visible light and/or infrared light images.

Control circuitry 16 may use information from tracking system 18 to selectively disable unoccupied viewing zones. Disabling unoccupied viewing zones conserves power within the electronic device. Control circuitry 16 may receive various types of information from tracking system 18 regarding the position of the viewer. Control circuitry 16 may receive raw data from head tracking system 18 and process the data to determine the position of a viewer, may receive position coordinates from head tracking system 18, may receive an identification of one or more occupied viewing zones from head tracking system 18, etc. If head tracking system 18 includes processing circuitry configured to process data from the one or more cameras to determine the viewer position, this portion of the head tracking system may also be considered control circuitry (e.g., control circuitry 16). Control circuitry 16 may include a graphics processing unit (GPU) that generates image data to be displayed on display 14. The GPU may generate image data based on the viewer position information.

In general, electronic device 10 includes one or more cameras 54 for capturing images of an environment around the display (e.g., an area in front of the display where viewers are expected to be located). Control circuitry within the electronic device uses the images from the one or more cameras to identify which viewing zones are occupied by the viewer. The control circuitry then controls the display accordingly based on the occupied viewing zones.

The viewing zones occupied by the viewer may always display images (e.g., be turned on) to ensure images are presented to the viewer. One or more viewing zones adjacent to the occupied viewing zones may also be turned on to ensure low latency if the user changes viewing zones. One or more unoccupied viewing zones may be turned off to conserve power in the device. This example is merely illustrative, and all of the viewing zones may remain on if desired.

Ideally, a viewer's eye in a given viewing zone would only receive light from display pixels assigned to that viewing zone. However, in practice, there may be crosstalk between adjacent viewing zones. In other words, a viewer's eye in viewing zone 6 in FIG. 6 may receive light from viewing zones 5 and 7 in addition to light from viewing zone 6. There may be a disparity between the images received from different viewing zones. The disparity between the images may result in undesired shifts in the positions of images perceived by the viewer.

Figure 8:
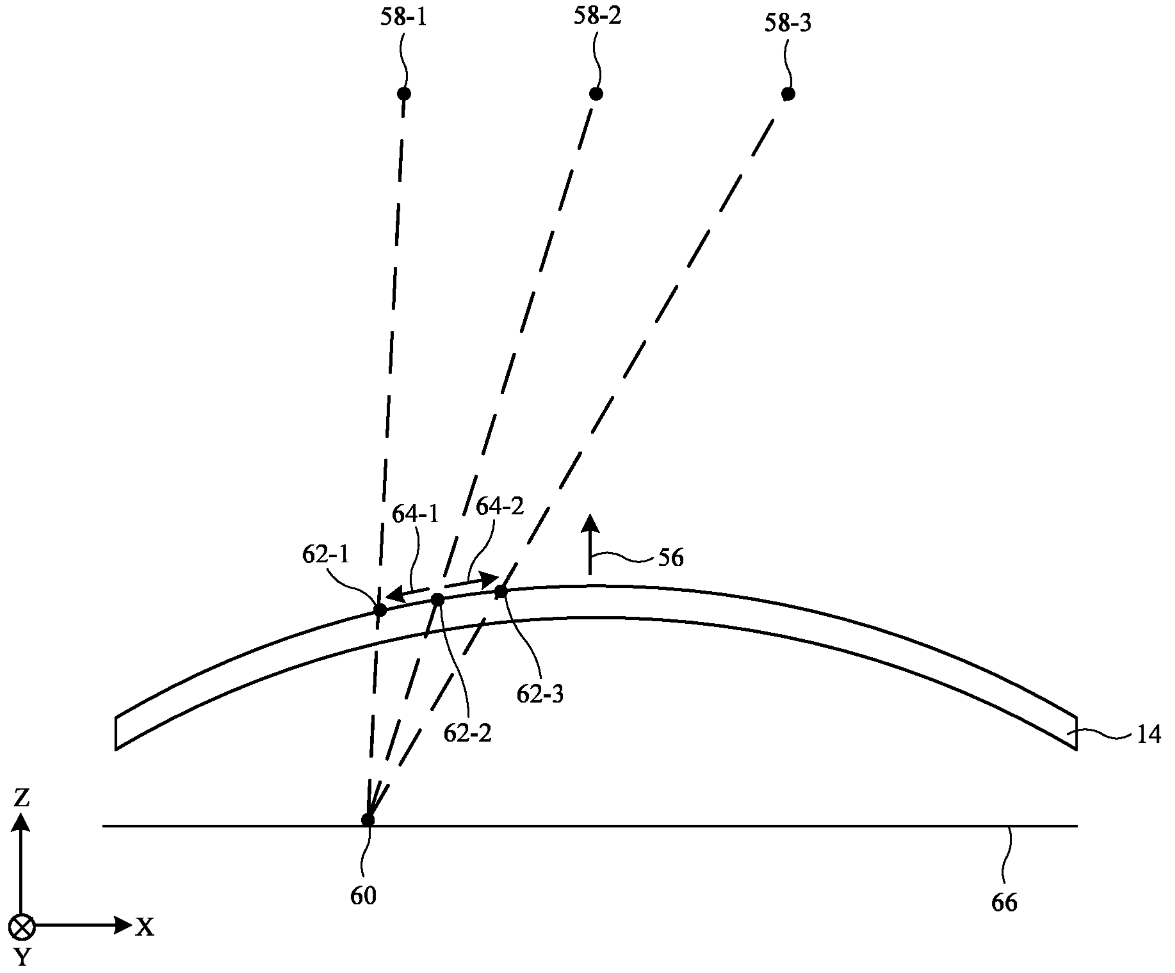
FIG. 8 is a side view of an illustrative lenticular display having varying disparity in accordance with an embodiment.

FIG. 8 is a side view of an illustrative display having convex curvature. Display 14 emits light in direction 56 towards a viewer. The display is curved in the direction of light-emission (e.g., the convex curvature faces the viewer). The display may have an upper surface and a lower surface. The upper (e.g., light-emitting) surface has convex curvature and the lower surface may have concave curvature (e.g., the display may have an approximately uniform thickness). The display (e.g., the light-emitting convex surface of the display) may have any desired radius of curvature (e.g., greater than 200 millimeters, greater than 400 millimeters, greater than 600 millimeters, greater than 800 millimeters, greater than 1,000 millimeters, less than 800 millimeters, less than 500 millimeters, less than 400 millimeters, less than 300 millimeters, less than 200 millimeters, etc.).

Display 14 may be configured to display images that, when perceived by the viewer, appear present on virtual plane 66 behind the display. Consider an example where display 14 displays images so that the viewer perceives a dot 60 (sometimes referred to as virtual dot 60) in virtual plane 66. The dot may be displayed on display 14 at point 62-1 to be viewable at viewing location 58-1. The dot may be displayed on display 14 at point 62-2 to be viewable at viewing location 58-2. The dot may be displayed on display 14 at point 62-3 to be viewable at viewing location 58-3.

There is a first disparity 64-1 between points 62-2 and 62-1. In other words, the physical location of dot 62 is shifted on the display by disparity 64-1 in order to cause dots 62-2 and 62-1 to appear at the same location on virtual plane 66. There is a second disparity 64-2 between points 62-2 and 62-3. In other words, the physical location of dot 62 is shifted on the display by disparity 64-2 in order to cause dots 62-2 and 62-3 to appear at the same location on virtual plane 66.

In the example of FIG. 8, the magnitude of disparity 64-2 is greater than the magnitude of disparity 64-1. The disparities present in the display may therefore cause shifting in images perceived by a viewer of display 14.

Figure 9:
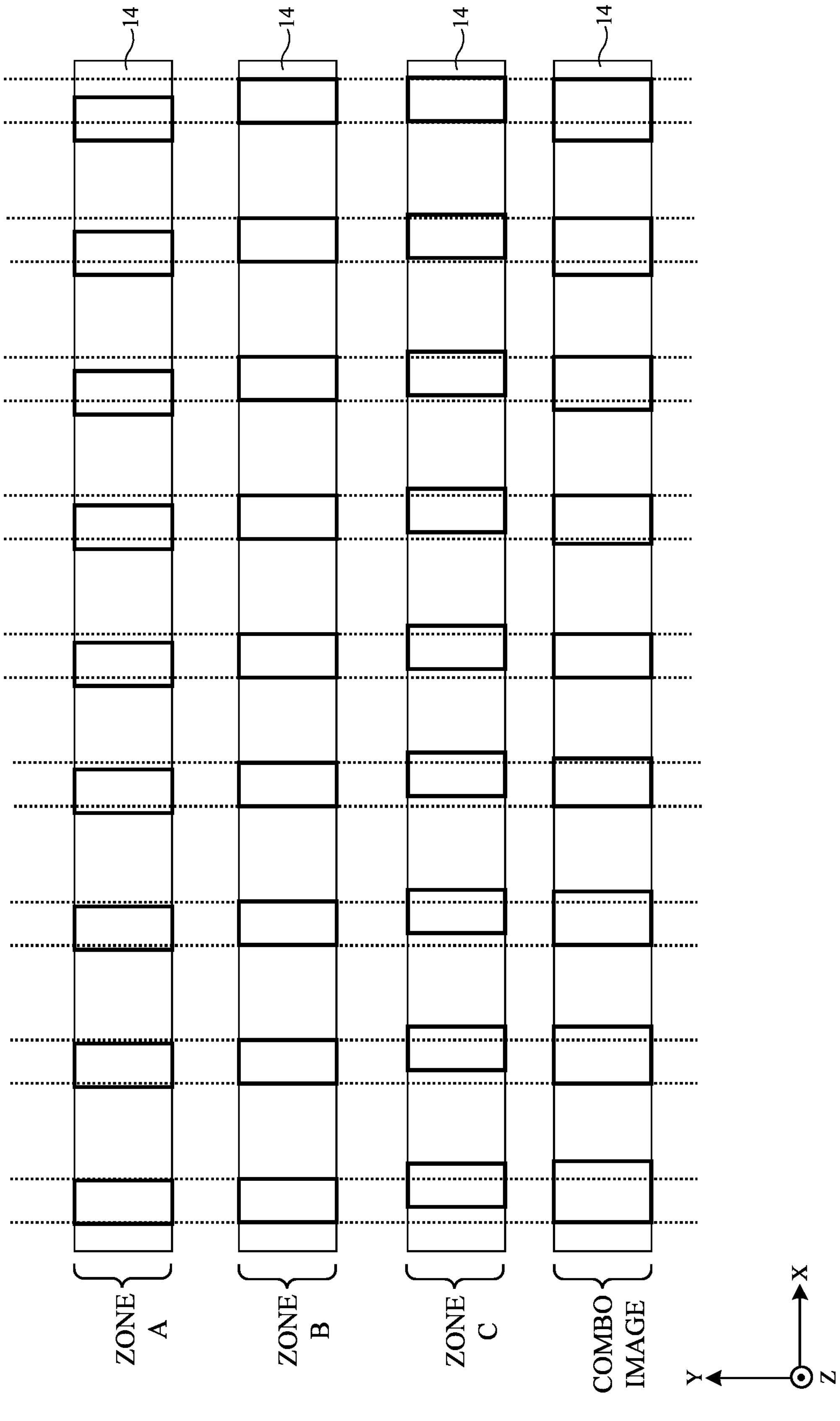
FIG. 9 is a diagram of various images displayed by a lenticular display showing how disparity causes horizontal shifts in the images in accordance with an embodiment.

FIG. 9 shows the effect of disparity on the display and how the disparity may ultimately cause shifting of the perceived content on the display. Viewing location 58-1 in FIG. 8 may be associated with a first viewing zone (e.g., viewing zone A). A subset of pixels on the display emit light that is viewable in zone A (e.g., at location 58-1 in FIG. 8). FIG. 9 shows an image displayed using the pixels in zone A as perceived by a viewer at location 58-2 (due to crosstalk of the zone A image into zone B).

Viewing location 58-2 in FIG. 8 may be associated with a second, different viewing zone (e.g., viewing zone B). A subset of pixels on the display emit light that is viewable in zone B (e.g., at location 58-2 in FIG. 8). FIG. 9 shows an image displayed using the pixels in zone B. FIG. 9 shows an image displayed using the pixels in zone B as perceived by a viewer at location 58-2.

Viewing location 58-3 in FIG. 8 may be associated with a third, different viewing zone (e.g., viewing zone C). A subset of pixels on the display emit light that is viewable in zone C (e.g., at location 58-3 in FIG. 8). FIG. 9 shows an image displayed using the pixels in zone C. FIG. 9 shows an image displayed using the pixels in zone C as perceived by a viewer at location 58-2 (due to crosstalk of the zone C image into zone B).

Consider the example where a viewer's eye is positioned at viewing location 58-2 (e.g., in zone B). When only the pixels in zone B are turned on (e.g., and zones A and C are turned off), an image as shown by 'zone B' in FIG. 9 may be perceived by the viewer. When only the pixels in zone A are turned on (e.g., and zones B and C are turned off), an image as shown by 'zone A' in FIG. 9 may be perceived by the viewer. When only the pixels in zone C are turned on (e.g., and zones A and B are turned off), an image as shown by 'zone C' in FIG. 9 may be perceived by the viewer. During normal operation of device 10, crosstalk may allow the viewer to receive the images from the pixels in zone A and zone C even when the viewer is positioned in zone B.

The convex curvature and lenticular arrangement of display 14 cause a disparity along the X-axis between the perceived images from zones A and B and from zones B and C. In the example of FIG. 9, a series of rectangles (e.g., vertical bars) are displayed across the display using zones A, B, and C. Each rectangle as displayed in zone B has edges defined by the dashed lines extending across FIG. 9. When zones A, B, and C are all turned on, it would be desirable for the image perceived by the viewer to match the image on zone B. However, in practice, the disparity between the perceived images from zones A and B and from zones B and C causes shifting of the images perceived by the viewer.

As shown in FIG. 9, the images displayed by zone A may be shifted in the negative X-direction relative to the images displayed by zone B due to the disparity of zone A relative to zone B. The magnitude of the shift increases in the positive X-direction. On the left side of the display, the shift may be small (e.g., a minimum shift amount which may be zero). On the right side of the display, the shift may be at a maximum.

As shown in FIG. 9, the images displayed by zone C may be shifted in the positive X-direction relative to the images displayed by zone B due to the disparity of zone C relative to zone B. The magnitude of the shift increases in the negative X-direction. On the right side of the display, the shift may be small (e.g., a minimum shift amount which may be zero). On the left side of the display, the shift may be at a maximum.

To reiterate, zones A, B, and C in FIG. 9 show how the display appears to a viewer at location 58-2 in FIG. 8 (e.g., at an on-axis or central viewing angle) with only that zone (e.g., zone A, B, or C) turned on. The combined image of FIG. 9 shows how the display appears to a viewer at location 58-2 in FIG. 8 when zones A, B, and C are all turned on at the same time. Due to crosstalk, the viewer receives images from zones A, B, and C when at viewing position 58-2 in FIG. 8. The combined perceived image is therefore an overlay of the respective images from zones A, B, and C.

As show in FIG. 9, on the left side of the display, the large disparity of zone C causes the combined image to have a right edge that is shifted in the positive X-direction (e.g., towards the center of the display). On the right side of the display, the large disparity of zone A causes the combined image to have a left edge that is shifted in the negative X-direction (e.g., towards the center of the display). The combined image therefore, in general, has vertical edges that are shifted towards the center of the display due to disparity in the display system.

It should be noted that the example in FIG. 9 is merely illustrative. In practice, the combined image may have blurred vertical edges caused by the overlay between images from multiple zones (e.g., crosstalk). For evaluation purposes, the rectangles displayed in FIG. 9 may have a solid color and may be separated by a different color (e.g., white rectangles separated by black). The edge of the rectangle may be defined as the point in which the luminance (in the color of the rectangle) along the vertical edge is a given percentage (e.g., 60% or another desired percentage) of the maximum luminance. Take an example where the rectangles are white and are separated by black. In a first point along the X-axis (e.g., in a central portion of the rectangle), the rectangle has a maximum luminance (e.g., 100%) along the Y-direction. At a second point along the X-axis (e.g., at the beginning of the blurred edge of the rectangle), the rectangle has 80% luminance along the Y-direction. At a third point along the X-axis (e.g., at the middle of the blurred edge of the rectangle), the rectangle has 50% luminance along the Y-direction. At a fourth point along the X-axis (e.g., at the end of the blurred edge of the rectangle), the rectangle has 20% luminance along the Y-direction. If 50% is the selected percentage that defines the edge of the rectangle, the edge of the rectangle is evaluated as being aligned with the third point along the X-axis.

Additionally, the example of the shift of the perceived images in FIG. 9 is merely illustrative. In the combined image of FIG. 9, the edges are shifted towards center of the display by increasing amounts with increasing distance from the center of the display (e.g., a linear and/or monotonic relationship). This need not be the case. Strengths of different cross-talks, the convex curvature of the display, the arrangement of the lenticular lens film over the display, and various other factors may cause deviations from this pattern. However, the problem of shift in perceived images caused by disparity (herein referred to as disparity-caused shifts) may still be present in the display.

To mitigate unintended shifts in perceived images caused by disparity, compensation of the displayed images may be performed. To compensate for disparity-caused shifts, the magnitude of the disparity-caused shift may be measured across the display. Because the display panel and corresponding disparity-caused shifts are symmetrical, the effect of disparity may only be measured for one half of the display. The effect of disparity measured for the first half of the display may then be assumed to also apply to the second half of the display.

Figure 10:
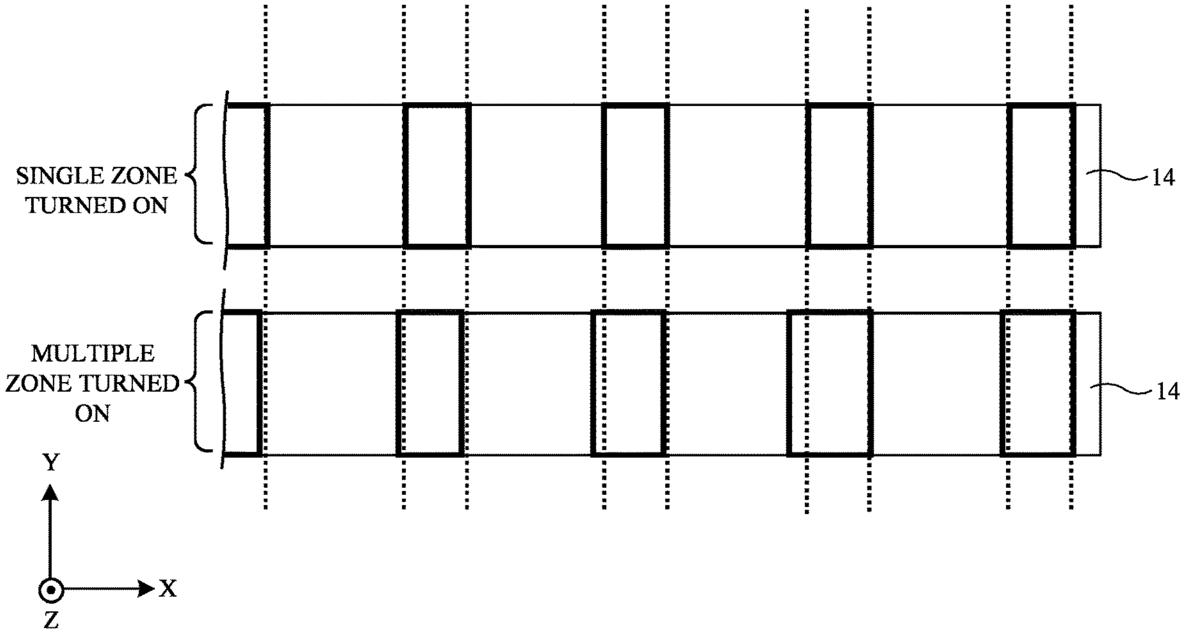
FIG. 10 is a diagram of various images displayed by a lenticular display during calibration measurements for disparity-caused shifts in accordance with an embodiment.

FIG. 10 is a diagram showing how calibration of display 14 may be performed. A camera may be placed at a desired location such as location 58-2 in FIG. 8 (e.g., an on-axis location that is positioned over a center of the display). First, the camera may capture images while a single zone is turned on. The single zone that is turned on may be the zone aligned with location 58-2 (e.g., zone B from FIG. 9). The display may display an image of vertical bars so that vertical edges are present across the display at periodic intervals. As shown by the upper portion of FIG. 10, when only a single zone is turned on, the edges have a uniform spacing and are not impacted by shift caused by disparity. The position along the X-axis of the edges of the vertical edges when only the single zone is turned on may be referred to as the baseline.

Next, the camera may capture images while multiple zones are turned on. For example, both the zone aligned with location 58-2 and adjacent zones aligned with adjacent viewing areas (e.g., zones A, B, and C in FIG. 9) are all turned on. All of the zones that are turned on may display an image of vertical bars so that vertical edges are present across the display at periodic intervals. As shown by the lower portion of FIG. 10, when multiple zones are turned on, the edges are shifted due to disparity differences in the display. The dashed lines show the alignment of the edges when just a single zone is turned on (e.g., the baseline position of the edges when not impacted by shifting).

FIG. 10 shows how the edge shift may not follow a linear trend as depicted in FIG. 9. Strengths of different cross-talks, the convex curvature of the display, the arrangement of the lenticular lens film over the display, and various other factors may cause deviations from a linear pattern, as shown in FIG. 10.

The images captured by the camera may be used to measure the shift of each edge across the display. For evaluation purposes, during the measurements for compensation, the rectangles (bars) displayed in FIG. 10 may have a solid color and may be separated by a different color (e.g., white bars separated by black). The edge of the rectangle may be defined as the point in which the luminance (in the color of the bar) along the vertical edge is a given percentage (e.g., 60% or another desired percentage) of the maximum luminance. Take an example where the bars are white and are separated by black. In a first point along the X-axis (e.g., in a central portion of the rectangle), the bar has a maximum luminance (e.g., 100%) along the Y-direction. At a second point along the X-axis (e.g., at the beginning of the blurred edge of the rectangle), the bar has 80% luminance along the Y-direction. At a third point along the X-axis (e.g., at the middle of the blurred edge of the rectangle), the bar has 50% luminance along the Y-direction. At a fourth point along the X-axis (e.g., at the end of the blurred edge of the rectangle), the bar has 20% luminance along the Y-direction. If 50% is the selected percentage that defines the edge of the bar, the edge of the bar is evaluated as being aligned with the third point along the X-axis.

The difference between the position of the edges along the X-axis when only one zone is turned on (as in the upper portion of FIG. 10) and when multiple zones are turned on (as in the lower portion of FIG. 10) is defined as the disparity-caused shift at that position in the display.

Figure 11:
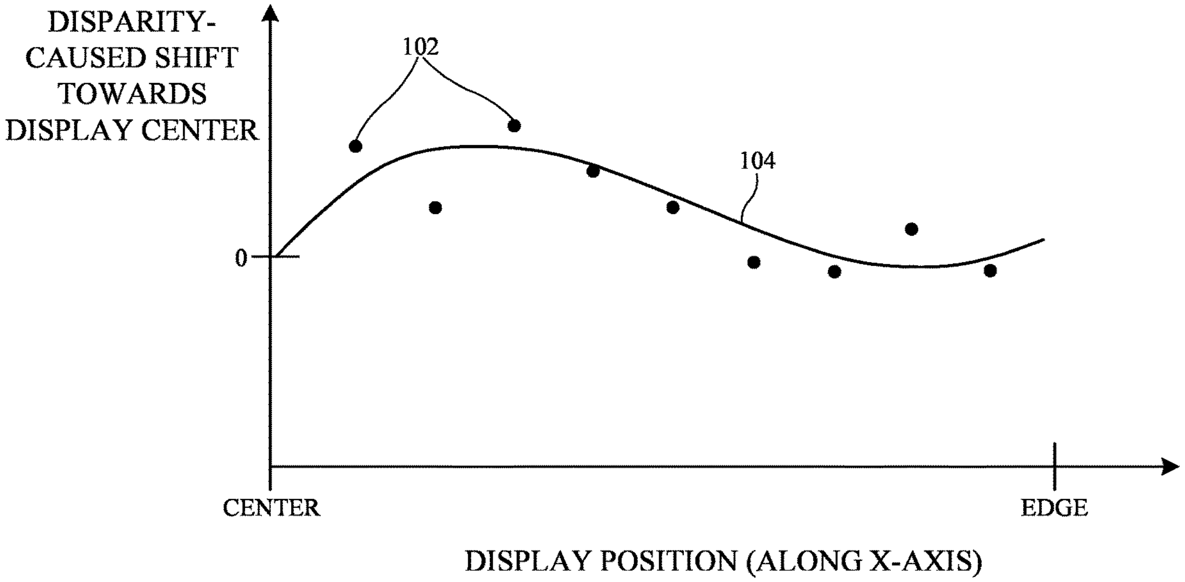
FIG. 11 is a graph of disparity-caused shift as a function of display position in accordance with an embodiment.

FIG. 11 is a graph of disparity-caused shift towards the display center as a function of display position (e.g., pixel location) along the X-axis. The disparity-caused shift may be assumed to be constant along the Y-direction of the display. Each data point 102 in the graph of FIG. 11 may come from measurements obtained during a calibration process of the type shown and described in connection with FIG. 10. FIG. 10 shows 9 dashed lines for edges of the vertical bars on the display. There are therefore 9 disparity-caused shift data points obtained from the calibration process of FIG. 10. FIG. 11 has 9 data points corresponding to the 9 disparity-caused shift data points from FIG. 10.

In FIG. 11, a positive shift is defined as a shift towards the center of the display. As shown, the magnitude of the shift varies along the X-axis of the display from the center of the display to the edge (e.g., the outermost edge) of the display. In FIG. 11, the shift varies in a non-linear pattern and may have both positive and negative magnitudes. In FIG. 11, a negative shift means that the edge is shifted away from the center and towards the edge of the display (instead of towards the center of the display).

A trend curve 104 may be fit to the data points 102 in the graph of FIG. 11. The trend curve 104 may be a polynomial curve that best fits the data points 102. The polynomial curve may be used to represent the disparity-caused shift across the display. Using a polynomial curve to represent the disparity-caused shift may ensure a smooth calibration and may mitigate the amount of memory required in device 10 to store the calibration information.

The polynomial curve fit to the data points in FIG. 11 may be a third order polynomial function, as one example. The third order polynomial function is represented by $f(x)=p3\times x^3+p2\times x^2+p1\times x+p0$, where x is the pixel location along the x-axis of the display, p0, p1, p2, and p3 are constants, and the output of the function is the disparity-caused pixel shift. Constants p0, p1, p2, and p3 may be selected to best fit the polynomial curve to the data obtained from the calibration measurements.

The example of using a third order polynomial curve for trend curve 104 is merely illustrative. If desired, the trend curve may be a polynomial curve of a different order (e.g., second order, fourth order, fifth order, sixth order, greater than sixth order, etc.) or an entirely different type of curve.

Figure 12:
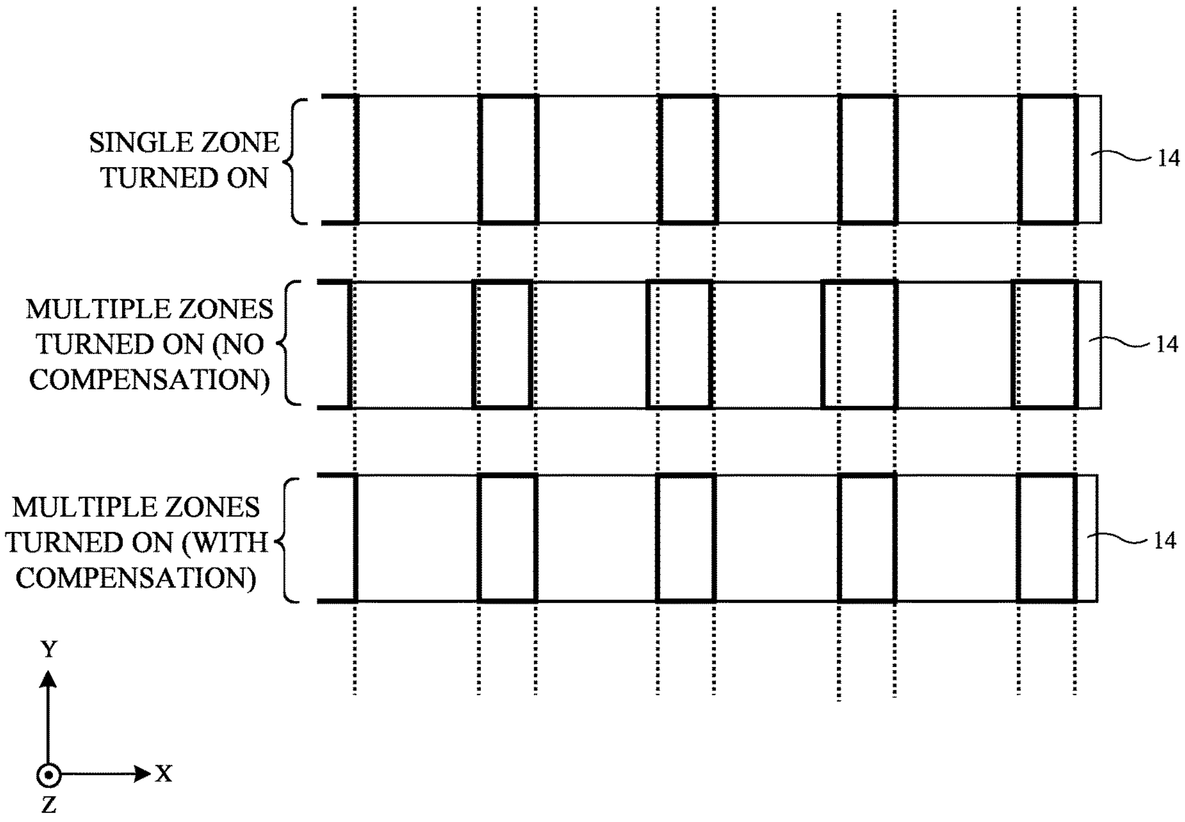
FIG. 12 is a diagram of various images displayed by a lenticular display showing the effect of disparity-caused shift compensation in accordance with an embodiment.

The trend curve obtained during the calibration measurements of FIG. 10 may be applied to data displayed on display 14 in real time to compensate for disparity-caused shift. FIG. 12 shows how the edge shift is mitigated following compensation using the trend curve of FIG. 11.

The difference between the position of the edges along the X-axis when only one zone is turned on (as in the upper portion of FIG. 12) and when multiple zones are turned on, without compensation, (as in the middle portion of FIG. 12)

reflects the disparity-caused shift in the display. However, as shown in the lower portion of FIG. 12, when multiple zones are turned on and compensation is applied, the edges of the vertical bars are aligned with their baseline position (from when only one zone is turned on as in the upper portion of FIG. 12). Compensating for disparity-cased shift using the trend curve therefore effectively mitigates (or removes) the disparity-caused shift from the perceived images on the display.

Figure 13:
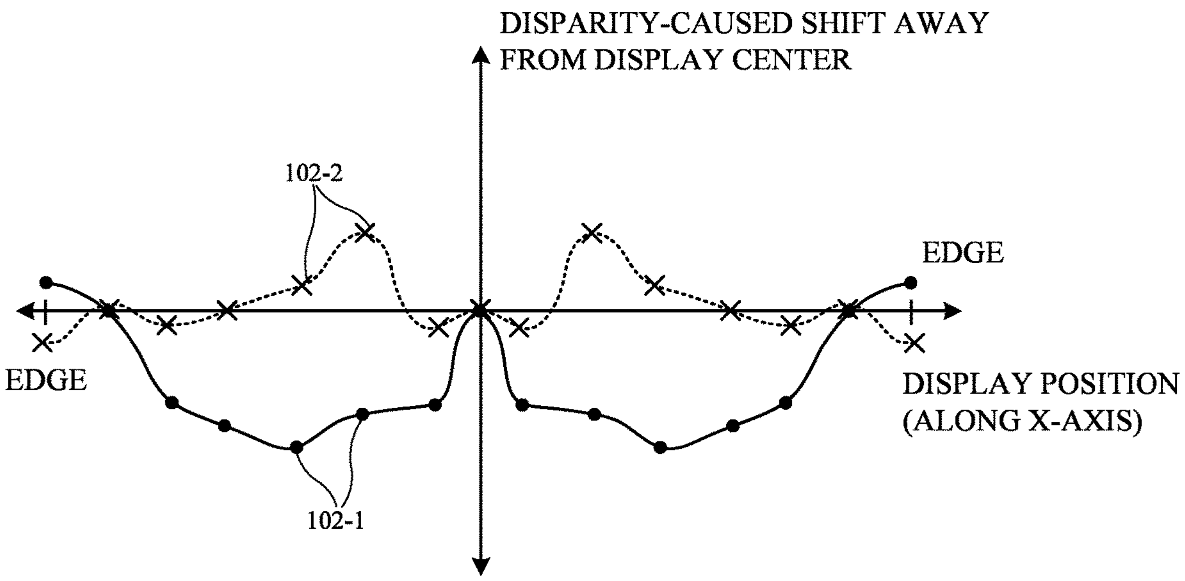
FIG. 13 is a graph of disparity-caused shift as a function of display position for both compensated images and uncompensated images in accordance with an embodiment.

FIG. 13 is a graph of disparity-caused shift away from the display center as a function of display position (e.g., pixel location) along the X-axis. The disparity-caused shift may be assumed to be constant along the Y-direction of the display. Each data point 102-1 in the graph of FIG. 13 (marked with a dot) may measure the disparity-caused shift for a displayed image without compensation. Each data point 102-2 in the graph of FIG. 13 (marked with an X) may measure the disparity-caused shift for a displayed image with compensation.

In FIG. 13, a positive shift is defined as a shift away from the center of the display. A negative shift means that the edge is shifted towards the center and away from the edge of the display (instead of away from the center of the display). As shown, the magnitude of the shift varies along the X-axis of the display from the center of the display to the edges (e.g., the outermost left and right edges) of the display. In FIG. 13, for both the data points with and without compensation, the shift varies in a non-linear pattern and may have both positive and negative signs. However, the magnitude of the disparity-caused shift is lower when compensation is applied than when compensation is not applied. The compensation therefore mitigates disparity-caused shift in images displayed by display 14.

Figure 14:
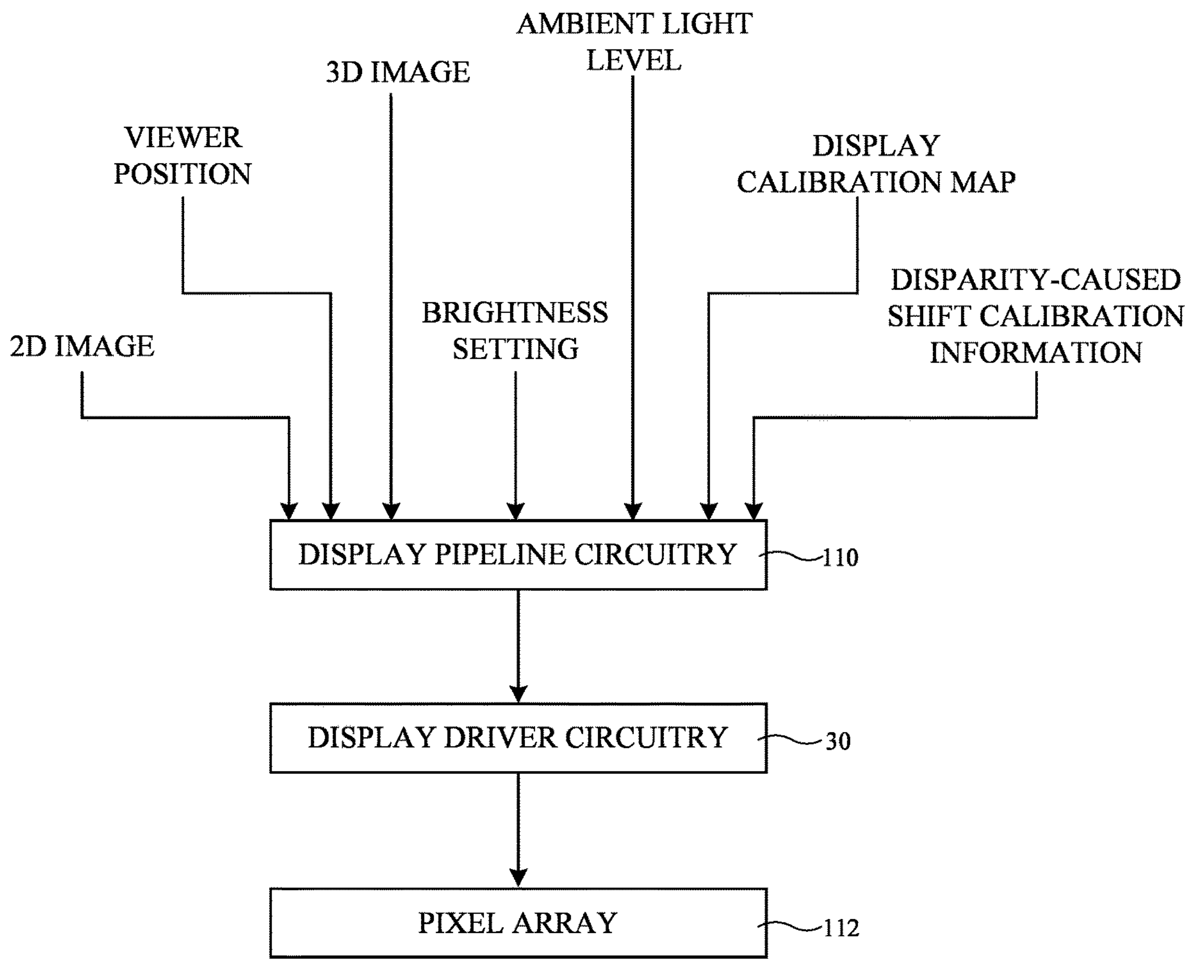
FIG. 14 is a diagram of an illustrative electronic device with display pipeline circuitry that generates images for a lenticular display in accordance with an embodiment.

FIG. 14 is a schematic diagram of an electronic device including display pipeline circuitry. The display pipeline circuitry 110 provides pixel data to display driver circuitry 30 for display on pixel array 112 (which includes pixels 22 as shown in FIG. 2). Pipeline circuitry 110 may use various inputs to render an image and generate pixel brightness values for each pixel in the pixel array based on the image. In the example of FIG. 14, the display may be used to provide images of the same content at different perspectives in each viewing zone. In other words, each subset of the pixel array associated with a given viewing zone displays a different view of the same content. As a viewer changes viewing zones, the appearance of the content gradually changes to simulate looking at a real-world object.

The display pipeline circuitry may render a plurality of two-dimensional images of target content, with each two-dimensional image corresponding to a different view of the target content. In one example, the target content may be based on a two-dimensional (2D) image and a three-dimensional (3D) image. The two-dimensional image and the three-dimensional image may optionally be captured by a respective two-dimensional image sensor and three-dimensional image sensor in electronic device 10. This example is merely illustrative. The content may be rendered based on two-dimensional/three-dimensional images from other sources (e.g., from sensors on another device, computer-generated images, etc.). In some cases, the content may be rendered based on the viewer position detected by eye and/or head tracking system 18.

The images generated by display pipeline circuitry 110 may be compensated based on various factors. For example, the images may be compensated based on a brightness setting for the device, ambient light levels, disparity-caused shift calibration information (e.g., the trend curve from FIG. 13), and/or a viewer position that is detected using eye tracking system 18. Display pipeline circuitry 110 may include a pixel map (sometimes referred to as a display calibration map or view map) that is used to determine which pixels in the pixel array correspond to each view. A plurality of two-dimensional images may be applied to the views of the display according to the pixel map. Additional compensation steps may be performed after determining the pixel data for the entire pixel array. Once the additional compensation is complete, the pixel data may be provided to the display driver circuitry 30. The pixel data provided to display driver circuitry 30 includes a brightness level (e.g., voltage) for each pixel in pixel array 112. These brightness levels are used to simultaneously display a plurality of two-dimensional images on the pixel array, each two-dimensional image corresponding to a unique view of the target content that is displayed in a respective unique viewing zone.

Figure 15:
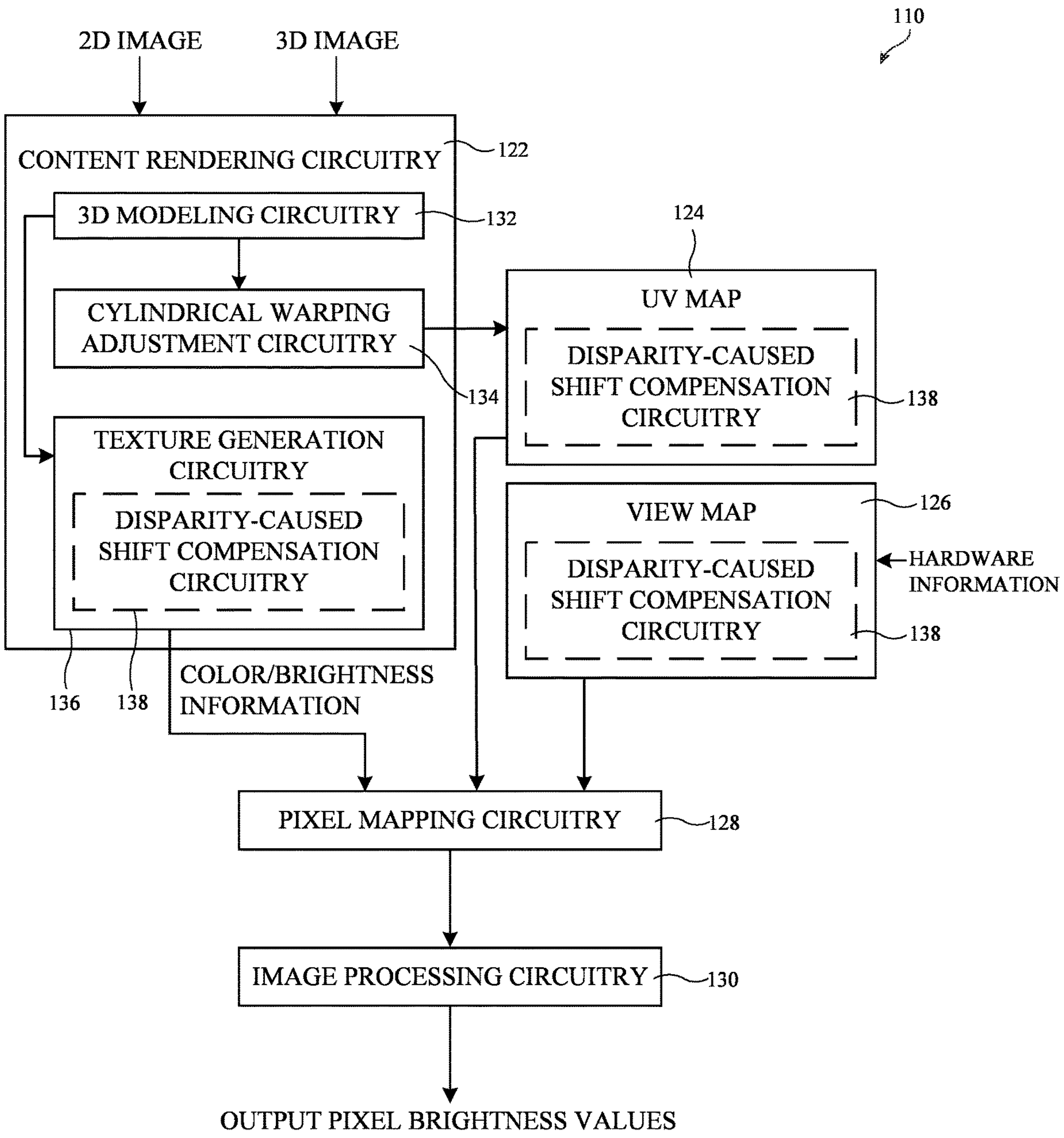
FIG. 15 is a diagram of illustrative display pipeline circuitry for a lenticular display that compensates for disparity-caused shifts in accordance with an embodiment.

As shown in FIG. 15, display pipeline circuitry 110 may include content rendering circuitry 122, UV map 124, view map 126, pixel mapping circuitry 128 (sometimes referred to as mapping circuitry 128), and image processing circuitry 130. Content rendering circuitry 122 includes three-dimensional (3D) modeling circuitry 132, cylindrical warping adjustment circuitry 134, and texture generation circuitry 136.

Content rendering circuitry 122 may render content to be displayed on display 14. As previously discussed, there is flexibility in the type of content that is displayed in each of the viewing zones of display 14. However, herein an illustrative example will be described where the viewing zones are used to display images of the same content at different perspectives (views). In other words, each subset of the pixel array associated with a given viewing zone displays a different view of the same content. As a viewer changes viewing zones, the appearance of the content gradually changes to simulate looking at a real-world object.

Content rendering circuitry 122 may render content for the plurality of views based on a received two-dimensional (2D) image and a three-dimensional (3D) image (e.g., from respective sensors in device 10). The two-dimensional image and three-dimensional image may be images of the same content. In other words, the two-dimensional image may provide color/brightness information for given content while the three-dimensional image provides a depth map associated with the given content. The two-dimensional image only has color/brightness information for one view of the given content. Content rendering circuitry 122 may optionally include a machine learning model.

Content rendering circuitry 122 may use 3D modeling circuitry 132 to generate a three-dimensional model of the content intended to be displayed (based on received three-dimensional images). Cylindrical warping adjustment circuitry 134 may perform adjustments on the three-dimensional model that correct for the convex curvature of display 14. Ultimately, content rendering circuitry 122 outputs information to UV map 124 (sometimes referred to as UV mapping circuitry 124 or mapping circuitry 124). A UV map (sometimes referred to as simply a map) is a flat representation of the surface of the three-dimensional content that is displayed on display 14. In other words, the UV map includes depth information (u, v) that represents the texture of the content ultimately displayed on display 14. UV mapping circuitry 124 may generate the final UV map based on information from cylindrical warping adjustment circuitry 134, as one example.

As shown in FIG. 15, the display pipeline circuitry also includes view map 126 (sometimes referred to as view mapping circuitry 126 or mapping circuitry 126). The view map may be based on hardware information associated with display 14 (e.g., the layout of pixels 22 in display 14, the dimensions of the lenticular lens film that covers the pixels, etc.). The view map (sometimes referred to simply as a map) output by view mapping circuitry 126 indicates how each view corresponds to the pixel array. For example, a first pixel in the display belongs to viewing zone 1, a second pixel in the display belongs to viewing zone 2, etc. The view map may be determined during display calibration operations (e.g., during manufacturing) and stored in view mapping circuitry 126 during operation of device 10. The view map may also be referred to as a display calibration map (as shown in FIG. 14, for example).

Content rendering circuitry 122 may also include texture generation circuitry 136 that generates color and brightness information for display 14. The color and brightness information generated by texture generation circuitry 136 may be based on the 2D image and/or 3D image received by content rendering circuitry 122. The texture generation circuitry 136 may output a single two-dimensional image (that is intended to be displayed on display 14) or a plurality of two-dimensional images, with each 2D image corresponding to a respective viewing zone of the display. In other words, a first 2D image is displayed in the first viewing zone, a second 2D image is displayed in the second viewing zone, etc.

Pixel mapping circuitry 128 may receive the color and brightness information from texture generation circuitry 136, the UV map from UV mapping circuitry 124, and the view map from view mapping circuitry 126. Based on the received information, pixel mapping circuitry 128 outputs pixel brightness values for each pixel in the display. Image processing circuitry 130 may perform optional adjustments (e.g., color compensation, border masking, burn-in compensation, panel response correction, dithering, etc.) to the output pixel brightness values that are ultimately provided to display driver circuitry 30 and displayed on pixel array 112.

As an example, the pixel mapping circuitry may identify a first subset of pixels in the pixel array that is visible at viewing zone 1 (e.g., using the view map). The pixel mapping circuitry then uses the UV map and the received color and brightness information to map a first two-dimensional image to the first subset of pixels. Once displayed, the first two-dimensional image is viewable at viewing zone 1. The pixel mapping circuitry may then identify a second subset of pixels in the pixel array that is visible at viewing zone 2 (e.g., using the view map). The pixel mapping circuitry then uses the UV map and the received color and brightness information to map a second two-dimensional image to the second subset of pixels. Once displayed, the second two-dimensional image is viewable at viewing zone 2. This type of pixel mapping is repeated for every view included in the display. Once complete, pixel mapping circuitry 128 outputs pixel data for each pixel in the pixel array. The pixel data includes a blend of independent, two-dimensional images (with different views of the same content).

It should be understood that the subset of pixels used to display each view may be non-continuous. For example, the subset of pixels for each view may include a plurality of discrete vertical pixel strips. These discrete sections of pixels may be separated by pixels that are used to display other views to the viewer.

Texture generation circuitry 136 may update the content provided to pixel mapping circuitry 128 on a frame-by-frame basis. UV mapping circuitry 124 may also intermittently update the UV map (e.g., based on a new 3D image received by content rendering circuitry 122). However, the UV map is not updated every frame.

Display pipeline circuitry 110 may include disparity-caused shift compensation circuitry 138 that is used to compensate for disparity-caused shifts along the X-axis of the display (as discussed in connection with FIGS. 8-14). Disparity-caused shift compensation circuitry 138 may be incorporated into display pipeline circuitry 110 at multiple possible locations. FIG. 15 shows how disparity-caused shift compensation circuitry 138 may be incorporated into texture generation circuitry 136, UV mapping circuitry 124, and/or view mapping circuitry 126.

The disparity-caused shift compensation circuitry 138 may include disparity-caused shift calibration information that is used to compensate for disparity-caused shift in the display. The disparity-caused shift calibration information may be, for example, data generated during calibration operations of the type shown and discussed in connection with FIGS. 10 and 11. The disparity-caused shift calibration information may be a polynomial curve that represents the disparity-caused shift across the display. Using this stored polynomial curve, the disparity-caused shift compensation circuitry may perform compensation that mitigates disparity-caused shift in the final image(s) displayed by display 14.

Consider the example where disparity-caused shift compensation circuitry 138 is incorporated in UV mapping circuitry 124. The UV mapping circuitry 124 may receive 3D model information from content rendering circuitry 122 (as previously discussed). UV mapping circuitry 124 generates a UV map that includes depth information (u, v) that represents the texture of the content for display 14. The UV map is a flat (2D) representation of the surface of the three-dimensional content that is displayed on display 14. Disparity-caused shift compensation circuitry 138 may compensate the 2D representation of the surface of the 3D content to mitigate disparity-caused shift in the display. The disparity-caused shift compensation circuitry 138 may apply the polynomial curve that represents disparity-caused shift to the UV map. This pre-distorts the UV map based on the measured disparity-caused shift. Later, the distortions (e.g., shifts) caused by disparity will be applied to the pre-distorted UV map, resulting in an undistorted perceived final image.

Consider the example where disparity-caused shift compensation circuitry 138 is incorporated in view mapping circuitry 126. The view mapping circuitry 126 may have a display calibration map (e.g., as determined during calibration operations) that indicates which physical pixels on the display panel correspond to which viewing zones. Disparity-caused shift compensation circuitry 138 may compensate the display calibration map (view map) to mitigate disparity-caused shift in the display. The disparity-caused shift compensation circuitry 138 may apply the polynomial curve that represents disparity-caused shift to the display calibration map. This pre-distorts the view map based on the measured disparity-caused shift. Later, the distortions (e.g., shifts) caused by disparity will be applied to the pre-distorted view map, resulting in an undistorted perceived final image.

Consider the example where disparity-caused shift compensation circuitry 138 is incorporated in texture generation circuitry 136. Disparity-caused shift compensation circuitry 138 may compensate the color and brightness information output by texture generation circuitry 136 to mitigate disparity-caused shift in the display. The disparity-caused shift compensation circuitry 138 may apply the polynomial curve that represents disparity-caused shift to the color and brightness information. This pre-distorts the color and brightness information based on the measured disparity-caused shift. Later, the distortions (e.g., shifts) caused by disparity will be applied to the pre-distorted color and brightness information, resulting in an undistorted perceived final image.

Display pipeline circuitry 110 in FIG. 15 may be considered part of display 14 and/or part of control circuitry 16. Display pipeline circuitry 110 in FIG. 15 may include storage such as hard disk drive storage, nonvolatile memory (e.g., flash memory or other electrically-programmable-read-only memory configured to form a solid state drive), volatile memory (e.g., static or dynamic random-access-memory), etc. Display pipeline circuitry 110 in FIG. 15 may also include one or more microprocessors, microcontrollers, digital signal processors, baseband processors, power management units, application specific integrated circuits, etc.

The foregoing is merely illustrative and various modifications can be made to the described embodiments. The foregoing embodiments may be implemented individually or in any combination.

What is claimed is:

1. An electronic device comprising:

a display that includes an array of pixels and a lenticular lens film formed over the array of pixels, wherein the lenticular lens film spreads light from the display in a horizontal direction and wherein the display has a plurality of independently controllable viewing zones in the horizontal direction;

display driver circuitry configured to control the array of pixels to display images; and display pipeline circuitry configured to provide brightness values for the images to the display driver circuitry, wherein the display pipeline circuitry includes compensation circuitry that is configured to compensate the brightness values for disparity-caused shift in the horizontal direction, the compensation circuitry stores disparity-caused shift calibration information, and the disparity-caused shift calibration information for a first half of the display is duplicated based on the disparity-caused shift calibration information for a second half of the display.

2. The electronic device defined in claim 1, wherein the disparity-caused shift calibration information comprises a third order polynomial function that outputs a shift magnitude based on a pixel location along the horizontal direction.

3. The electronic device defined in claim 1, wherein the display pipeline circuitry comprises mapping circuitry configured to generate a first map that includes depth information for the images displayed on the display and wherein the compensation circuitry is configured to compensate the brightness values for disparity-caused shift in the horizontal direction by compensating the first map.

4. The electronic device defined in claim 1, wherein the display pipeline circuitry comprises mapping circuitry configured to generate a first map that maps each pixel in the array of pixels to an associated independently controllable viewing zone in the plurality of independently controllable viewing zones and wherein the compensation circuitry is configured to compensate the brightness values for disparity-caused shift in the horizontal direction by compensating the first map.

5. The electronic device defined in claim 1, wherein the display pipeline circuitry comprises mapping circuitry configured to generate a first map that maps each pixel in the array of pixels to an associated independently controllable viewing zone in the plurality of independently controllable viewing zones and wherein the compensation circuitry is configured to compensate the brightness values for disparity-caused shift in the horizontal direction by compensating the first map based on the disparity-caused shift calibration information.

6. The electronic device defined in claim 1, wherein the display pipeline circuitry comprises content rendering circuitry configured to output color and brightness information and wherein the compensation circuitry is configured to compensate the brightness values for disparity-caused shift in the horizontal direction by compensating the color and brightness information.

7. The electronic device defined in claim 1, wherein the display pipeline circuitry comprises content rendering circuitry configured to output color and brightness information and wherein the compensation circuitry is configured to compensate the brightness values for disparity-caused shift in the horizontal direction by compensating the color and brightness information based on the disparity-caused shift calibration information.

8. The electronic device defined in claim 1, wherein the display pipeline circuitry further includes content rendering circuitry, first mapping circuitry, second mapping circuitry, and third mapping circuitry, wherein the third mapping circuitry is configured to generate a brightness value for each pixel in the array of pixels based on brightness and color information from the content rendering circuitry, a first map from the first mapping circuitry, and a second map from the second mapping circuitry, and wherein the compensation circuitry is configured to compensate a selected one of the brightness and color information from the content rendering circuitry, the first map from the first mapping circuitry, and the second map from the second mapping circuitry.

9. The electronic device defined in claim 8, wherein the first map is a flat representation of a surface of three-dimensional content presented on the display and the second map maps each pixel in the array of pixels to an associated independently controllable viewing zone in the plurality of independently controllable viewing zones.

10. An electronic device comprising:

a display that includes an array of pixels, wherein the display has a first surface and a second surface opposing the first surface, wherein the first surface has convex curvature, and wherein the array of pixels emits light through the first surface and away from the second surface;

a lenticular lens film arranged over the display that spreads light from the display in a horizontal direction, wherein the display has a plurality of independently controllable viewing zones in the horizontal direction;

display driver circuitry configured to control the array of pixels to display images; and display pipeline circuitry configured to provide brightness values for the images to the display driver circuitry based at least on disparity-caused shift calibration information, wherein the disparity-caused shift calibration information represents disparity-caused shift caused by at least the convex curvature of the first surface of the display, and wherein the disparity-caused shift calibration information for a first half of the display is duplicated based on the disparity-caused shift calibration information for a second half of the display.

11. The electronic device defined in claim 10, wherein the disparity-caused shift calibration information includes a third order polynomial curve that represents disparity-caused shift in the horizontal direction as a function of pixel location in the horizontal direction.

12. The electronic device defined in claim 10, wherein the display pipeline circuitry is configured to provide brightness values for the images to the display driver circuitry based at least on the disparity-caused shift calibration information and a display calibration map that maps each pixel in the array of pixels to an associated independently controllable viewing zone in the plurality of independently controllable viewing zones.

13. The electronic device defined in claim 10, further comprising:

a two-dimensional image sensor that is configured to capture a two-dimensional image of content; and a three-dimensional image sensor that is configured to capture a three-dimensional image of the content, wherein the display driver circuitry is configured to control the array of pixels to display images of the content and wherein the display pipeline circuitry is configured to provide brightness values for the images to the display driver circuitry based at least on the disparity-caused shift calibration information, the two-dimensional image, and the three-dimensional image.

14. The electronic device defined in claim 13, wherein the display pipeline circuitry comprises:

3D modeling circuitry configured to generate a three-dimensional model of the content; and cylindrical warping adjustment circuitry configured to adjust the three-dimensional model of the content to correct for the convex curvature of the first surface of the display.

15. The electronic device defined in claim 10, wherein the disparity-caused shift is caused by at least an arrangement of the lenticular lens film over the display.

16. An electronic device comprising:

a display that includes an array of pixels and a lenticular lens film formed over the array of pixels, wherein the lenticular lens film spreads light from the display in a horizontal direction;

first mapping circuitry configured to generate a first map that includes depth information for content displayed on the display, wherein the first map is a compensated first map that is compensated based on stored disparity-caused shift calibration information; and second mapping circuitry configured to generate a brightness value for each pixel in the array of pixels based at least on the compensated first map from the first mapping circuitry, wherein the first map is updated less frequently than the second mapping circuitry generates the brightness values.

17. The electronic device defined in claim 16, wherein the disparity-caused shift calibration information comprises a third order polynomial function that outputs disparity-caused shift in the horizontal direction as a function of pixel location in the horizontal direction.

18. The electronic device defined in claim 16, wherein the display has a plurality of independently controllable viewing zones in the horizontal direction, wherein the first mapping circuitry is UV mapping circuitry, wherein the first map is a UV map that is a flat representation of a surface of three-dimensional content presented on the display, wherein the second mapping circuitry is pixel mapping circuitry, and wherein the electronic device further comprises:

texture generation circuitry that generates color and brightness information for a plurality of two-dimensional images, each two-dimensional image corresponding to a respective independently controllable viewing zone of the plurality of independently controllable viewing zones; and view mapping circuitry that generates an additional map that maps each pixel in the array of pixels to an associated independently controllable viewing zone in the plurality of independently controllable viewing zones, wherein the pixel mapping circuitry is configured to generate the brightness value for each pixel in the array of pixels based at least on the UV map from the UV mapping circuitry, the color and brightness information from the texture generation circuitry, and the additional map from the view mapping circuitry.

19. An electronic device comprising:

a display that includes an array of pixels and a lenticular lens film formed over the array of pixels, wherein the lenticular lens film spreads light from the display in a horizontal direction;

a two-dimensional image sensor that is configured to capture a two-dimensional image of content;

display driver circuitry configured to control the array of pixels to display images of the content; and display pipeline circuitry configured to provide brightness values for the images to the display driver circuitry, wherein the display pipeline circuitry comprises:

first circuitry that is configured to adjust the brightness values to compensate for crosstalk in the horizontal direction, wherein the first circuitry stores calibration information associated with the crosstalk;

second circuitry that is configured to generate a brightness value for each pixel in the array of pixels based at least on the calibration information stored by the first circuitry and the two-dimensional image of the content, wherein the first circuitry adjusts the brightness values less frequently than the second circuitry generates the brightness values; and third circuitry configured to adjust the brightness values provided by the second circuitry.

20. The electronic device defined in claim 19, wherein the third circuitry is further configured to perform color compensation to the brightness values provided by the second circuitry and to provide the brightness values to the display driver circuitry.

* * * * *